United States Patent [19]

Goetsch et al.

[11] Patent Number: 4,888,131

[45] Date of Patent: Dec. 19, 1989

[54] SYNTHESIS GAS PREPARATION AND CATALYST THEREFOR

[75] Inventors: Duane A. Goetsch; Geoffrey R. Say; Jose M. Vargas; Paul E. Eberly, all of Baton Rouge, La.

[73] Assignee: Exxon Research and Engineering Company, Florham Park, N.J.

[21] Appl. No.: 357,233

[22] Filed: May 26, 1989

Related U.S. Application Data

[63] Continuation-in-part of Ser. No. 174,174, Mar. 28, 1988, abandoned.

[51] Int. Cl.$^4$ .......................... C01B 3/28; C01B 3/30
[52] U.S. Cl. ..................................................... 252/373
[58] Field of Search ........................................ 252/373

[56] References Cited

U.S. PATENT DOCUMENTS 3,119,667  1/1964  McMahon .
3,232,726  2/1966  Eagle et al. .
3,524,819  8/1970  Guerrieri .

FOREIGN PATENT DOCUMENTS 743945  6/1970  Belgium .

OTHER PUBLICATIONS

Yerushalmi et al, Chem. Tech., Sep., 1978, pp. 564-572.

Primary Examiner—Howard T. Mars
Attorney, Agent, or Firm—Jay Simon

[57] ABSTRACT

Synthesis gas is produced by the reaction of light hydrocarbons, primarily methane, in a fluid bed reaction zone of attrition resistant nickel on alpha-alumina catalyst, with steam and oxygen and the conversion level is preserved by limiting the loss of nickel from the reaction and thereby limiting the back reaction of the synthesis gas to form methane in the presence of entrained catalyst in a cooling zone.

5 Claims, 5 Drawing Sheets

SYNTHESIS GAS PREPARATION AND CATALYST THEREFOR

CROSS REFERENCE TO RELATED APPLICATIONS

This application is a continuation-in-part of U.S. Ser. No. 174,174, filed Mar. 28, 1988 now abandoned.

FIELD OF THE INVENTION

This invention relates to a fluid bed process for preparing synthesis gas, carbon monoxide and hydrogen, and a catalyst useful therein. More particularly, this invention relates to a catalytic process wherein a light hydrocarbon, primarily methane, is converted to synthesis gas and the catalyst used therein allows the methane converted to synthesis gas to remain substantially as synthesis gas when the product synthesis gas is cooled. More particularly, the catalyst used in preparing the synthesis gas is such that the back reaction of carbon monoxide and hydrogen to form methane during the cooling step is substantially eliminated because very little, if any, catalyst is present during the cooling step.

BACKGROUND AND PRIOR ART

The production of synthesis gas by either partial oxidation or steam reforming is well known and there are extensive literature references to these processes. Each process may be used separately to produce synthesis gas or the processes may be combined.

The steam reforming reaction is highly endothermic and is described as:

$$CH_4 + H_2O \rightleftharpoons CO + 3 H_2 \quad (1)$$

The partial oxidation reaction is highly exothermic and is described as:

$$CH_4 + \rightarrow CO + H_2 + H_2O \quad (2)$$

The combination of the two reactions is somewhat exothermic and is described as:

$$2 CH_4 + O_2 \rightarrow 2 CO + 4H_2 \quad (5)$$

In addition to these two primary reactions, the water gas shift reaction also occurs:

$$CO + H_2O \rightleftharpoons H_2 + CO_2 \quad (6)$$

The equation for the combined process shows that the ratio of produced hydrogen to carbon monoxide is 2/1. This ratio is convenient for utilizing the synthesis gas in the production of higher molecular weight hydrocarbons through the Fischer-Tropsch reaction. The ratio of $H_2/CO$ can be varied by changing the mole ratios of $CH_4/H_2O/O_2/CO_2$ and by changing reactor temperature and pressure.

Patents illustrating the related processes are: U.K. 637,776; 1,359,877 and 2,119,276: U.S. Pat. Nos. 3,976,504; 3,984,210; 4,048,091; 4,414,140; 4,415,484; 2,425,754; 2,541,657; 2,577,563; 2,607,670; 2,631,094; 2,665,199; 3,168,386; 3,355,248; 3,379,504; 3,573,224; 3,644,100; 3,737,291; 3,953,356; and 4,309,198; and Japanese 580,910,022. Patents illustrative of the reaction between methane, steam and oxygen over a nickel catalyst are: 1,711,036; 3,138,438; 2,467,966; 1,736,065; and 1,960,912. These latter patents show the reaction occurring either in a fixed bed of catalyst or in a fluid catalyst bed.

Catalysts comprising nickel on alumina are well known, c.f. G. W. Bridger "Catalysis", *The Steam Reforming of Hydrocarbons*, page 39. One conclusion of this reference is that increasing amounts of nickel up to about 20 wt % nickel increases the activity of the nickel/alumina catalyst and nickel levels for steam reforming catalyst are reported, generally, as ranging from about 8 wt % to 20 wt % of catalyst.

Fluid bed processes are well known for the advantages they provide in heat transfer and mass transfer. Fluidized beds allow for substantially isothermal reactor conditions and are effective in eliminating temperature runaways or hot spots. Such processes are not without their disadvantages and the use of fluidized systems must take into consideration the strength of the catalyst (its resistance to attrition) as well as the erosivity of the catalyst (the tendency of the catalyst to erode equipment).

The production of synthesis gas in fluid bed processes is particularly sensitive to catalyst strength. If the catalyst undergoes severe attrition in which fine catalyst particles are formed, these fine particles will be entrained in the product gas and carried through and out of the fluid bed regardless of whether cyclones are employed for fines recovery. This not only causes high catalyst make-up rates, but also causes downstream fouling and other associated problems which are further described below.

Methane conversion to synthesis gas is affected deleteriously by catalyst attrition because (i) particles are lost from the fluid bed system as fines, thereby decreasing the volumetric activity of the fluid bed of catalyst and requiring that fresh catalyst be added in order to maintain acceptable levels of methane conversion, and (ii) catalyst fines entrained in the product gas and carried out of the fluid bed tend to deposit on equipment outside the fluid bed and (because equation (1) above is reversible) methane can be re-formed as the temperature is decreased and a new reaction equilibrium is established. In either case, the net conversion of methane is decreased. Relatively high residual methane in the synthesis gas can cause a substantial economic debit when the synthesis gas is used, for example, in Fischer-Tropsch processes.

The object of this invention is not only to provide a catalytic, fluid bed, hydrocarbon conversion process that minimizes the necessity of adding catalyst to the fluid bed to maintain volumetric activity, but more importantly, to minimize the methane concentration in the cooled recovered gases by minimizing the amount of catalytic material carried out of the bed, thereby minimizing the back reaction of carbon monoxide and hydrogen to form methane.

SUMMARY OF THE INVENTION

Synthesis gas is produced by converting a light hydrocarbon feed, primarily comprised of methane, in a reaction zone wherein a catalyst comprised of nickel and supported primarily on alpha alumina is maintained in a fluidized bed at elevated temperatures and the feed is reacted with steam and oxygen. The product synthesis gas contains carbon monoxide and hydrogen and some entrained catalyst particles. As the gas is cooled in a second zone to a temperature below that which favors the reformation of methane from carbon monoxide and hydrogen, the gas passes through a temperature range which favors that reformation reaction in the presence of entrained catalyst. This invention provides a method for minimizing the methane reformation by minimizing the quantity of nickel containing catalyst entrained in the product gas. Entrained catalyst is minimized by using an attrition resistant catalyst that does not form substantial amounts of fines that can be carried over from the reaction zone to the cooling zone.

Thus, the methane converted to synthesis gas in the reaction zone is preserved substantially as synthesis gas in the cooling zone. The net conversion of methane is the methane converted in the reaction zone less the methane reformed in the cooling zone. This invention allows at least about 90% of the methane, converted in the reaction zone to be preserved as synthesis gas after the product gas exits the cooling zone.

DETAILED DESCRIPTION OF THE INVENTION

The production of synthesis gas by this invention is carried out at conditions of elevated temperatures and pressures that favor the formation of hydrogen and carbon monoxide when, for example, methane is reacted with oxygen and steam. Temperatures are usually in excess of about 1700° F. but not so high as to cause disintegration of the catalyst or the sticking of catalyst particles together. Preferably, temperatures range from about 1750° F. to about 1950° F., more preferably, about 1800° F. to 1850° F. Pressure may range from atmospheric to about 40 atmospheres. Where the ratio of hydrogen to carbon monoxide in the synthesis gas becomes important and where, for example, the synthesis gas will be used in a Fischer-Tropsch type process, higher pressures are preferred, that is, about 20–30 atmospheres, which allows the subsequent process to proceed without intermediate compression of product gases.

Methane, steam, and oxygen are introduced into the fluid bed by various techniques which include means to prevent burning of the methane prior to introduction into the fluidized catalyst bed. This may be accomplished by separately injecting the methane and oxygen into the bed or by diluting each stream with steam as it enters the bed. Preferably, methane and steam are pre-mixed in a molar ratio of about 1 to 3, respectively, and more preferably 1.5 to 2.5 and are injected into the bed. The molar ratio of oxygen to methane is about 0.2 to 1.0, preferably 0.4 to 0.6.

Figure 1:
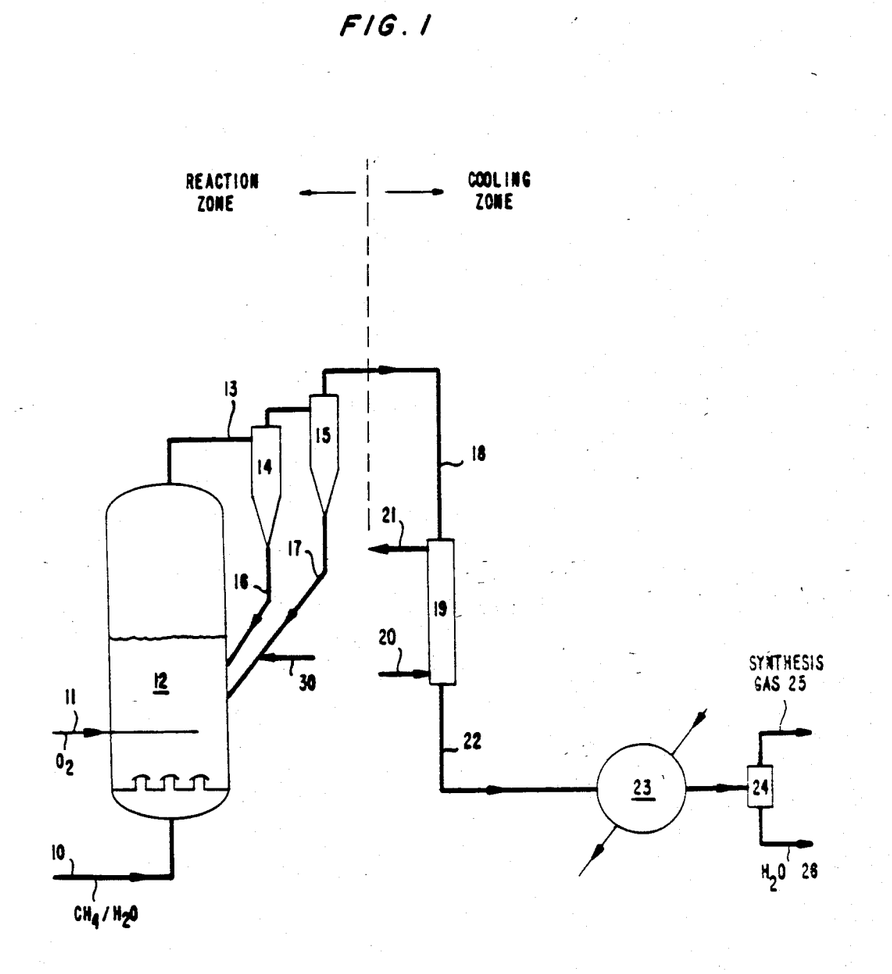
FIG. 1 is a schematic of the synthesis gas production process.

Referring now to FIG. 1 for the process flow scheme, methane and steam are pre-mixed in line 10 and enter the fluid bed reactor 12 where, e.g., a 1 wt % nickel on alumina catalyst is maintained in a fluidized state. Oxygen is separately injected into reactor 12 through line 11. The overhead product gases in line 13 include hydrogen, carbon monoxide, unconverted methane, some steam and lesser amounts of carbon dioxide along with entrained catalyst in the form of catalyst particles that have escaped the fluid bed as catalyst fines. Cyclones 14 and 15 trap catalyst particles and some fines and return these to the fluid bed via diplegs 16 and 17. Make up catalyst, that is, fresh catalyst added to account for catalyst lost as fines, can be added through either one of the diplegs as shown by line 30. The number and placement of cyclones is optional. A primary cyclone may be used along with a secondary and even a tertiary cyclone. The cyclones can be placed within the reactor vessel or external to the vessel. These options are not shown and are at the designers discretion. The important point is that regardless of the number or placement of the cyclones, some fines will escape by virtue of entrainment in the product gases and deposit in line 18 and in the waste heat boiler 19 where water enters through line 20 and leaves as steam through line 21. The cooling provided by the boiling water quenches the reaction products from about 1800 F. to less than about 1200° F. The cooled gases in line 22 can be further quenched in heat exchanger 23 to about 500°–600° F. and water in the product can be separated in vessel 24 with the synthesis gas product exiting through line 25 and with the condensed water leaving through line 26.

The reverse reaction of hydrogen and carbon monoxide to reform methane can occur in line 18 and wasteheat boiler 19 at temperatures below about 1780° F. The rate of the back reaction falls off as temperature is decreased to below about 1200° F., preferably below about 900° F. when catalyzed by fine catalyst particles that have either coated or have become deposited in line 18 or in waste heat boiler 19. An attrition resistant catalyst reduces the catalyst fines generated and the consequent entrainment and carry over of these fines from the bed and into the downstream equipment. By reducing fines in the downstream equipment, the nickel loss is minimized thereby achieving a maximum net conversion of methane in the process.

As a result of this process, unconverted methane in the product gas is less than about 8 mole %, preferably less than about 4 mole %, based on dry gas for operation at 1800° F., 360 psia with a typical $CH_4/H_2O/O_2$ feed mixture.

Because reaction conditions are quite severe and catalyst integrity is important, the support for the nickel is preferably alpha alumina, the most stable form of alumina at reaction conditions. The surface area is less than about 1 $m^2/g$ of catalyst. Silica is often used to stabilize alumina but at high steam partial pressures, silica is converted into a volatile material that reduces the integrity of the catalyst particle. The support is preferably at least 95 wt % alpha alumina, more preferably at least about 98% alpha alumina and silica is substantially absent. Low levels of silica may be tolerated, that is less than about 1.5 wt %, preferably less than about 1 wt %, and most preferably less than about 0. wt %.

At high temperatures and in the presence of steam silica tends to react with steam to form $Si(OH)_4$ which vaporizes. This result is supported in the Catalyst Handbook, 1970, p. 80, Springer-Verlag New York, Inc.

The objectives of this invention are achieved by utilizing an attrition resistant catalyst and thereby reducing the amount of fines formed during the process. While catalyst particle sizes are those that are readily fluidized and remain in the fluid bed, the preferred size range is from about 20 to 150 microns, preferably 30-150 microns, and most preferably 30-120 microns. Fines or fine particles resulting from catalyst attrition are generally less than about 20 microns in size. These fines are of a size that cyclones, even efficient cyclones (used for the recovery of catalyst particles that escape the fluidized bed), cannot efficiently capture them and return them to the fluid bed.

Catalyst particle density has been found to be a good indicator of attrition characteristics for alpha-$Al_2O_3$. As particle density increases, the rate of attrition decreases. While lower particle densities lead to better contact effectiveness (and smaller reactor volume), lower density also increases the void space in a catalyst particle and makes the particle more susceptible to attrition. In order to minimize the amount of catalyst lost through attrition, particle density should be greater than about 2.2 grams/cc, preferably greater than about 2.4 grams/cc, as measured by mercury porosimeter. Increasing particle density serves to further reduce attrition rates and thereby reduce the amount of fines formed during the process. Increasing particle density, however, also tends to increase catalyst erosivity properties and while a high particle density is preferred from an attrition point of view, consideration must also be given to the equipment in use, its life under erosive conditions, the expense of replacement or the expense of providing linings to reduce the consequences of erosion. Preferably, particle density ranges from about 2.4 to about 3.9 grams/cc, more preferably about 2.5 to 3.8 g/cc, still more preferably about 2.7 to 3.6 g/cc. Previous patents and literature references have not recognized the importance of catalyst particle density in achieving a catalyst than can operate effectively at the severe process conditions required by the process described in this invention.

Particle density as it is defined in this specification is different from skeletal density which is the normal method for reporting density in the literature. Skeletal density is usually much higher than particle density. For example, in Kirk-Othmer, the Encyclopedia of Chemical Technology, 2nd Ed. 1963, Vol. 1, p. 46, Interscience Publishers, New York. The density of alpha alumina is reported 3.98 g/cc. However, this is a skeletal density that does not account for void space in a particle. However, void space is a critical property in determining the attrition resistance of a particle. The greater the void volume, the lower the particle density, and the lower the attrition resistance. Thus, alpha-alumina as made and before heat treating to achieve the desired density for practicing this invention, has a particle density of about 1.75 g/cc, even though its skeletal density is much higher, e.g., about 3.98. Whenever density is used in this specification, the term will refer to particle density unless otherwise noted.

Ideally, particle density is equal to the mass of the particle divided by the volume the particle would displace if its surface were non-porous. Practically, particle density is measured by taking a single mercury prosimetry measurement. Pressure is gradually increased from 1.5 to 60,000 psia to obtain a mercury intrusion profile for the alumina sample using a Micrometrics 9210 Porosimeter. The intrusion profile is a plot of the volume of mercury intruded into the particle versus pressure.

At mercury pressures up to 24-26 psia, only the voids between particles are filled with mercury and at this point no mercury has entered the internal particle pore structure. The particle density is calculated by dividing the sample weight by the difference between the sample volume ($V_s$) and the volume of mercury intruded at the 24-26 psia pressure level. This is shown in the following formula:

$$P_p = \frac{W}{V_s - V_v}$$

wherein $P_p$ is the particle density, W is the weight of the sample; $V_s$ is the bulk volume of the sample; and $V_v$ is the void volume obtained at 24-26 psia by porosimetry.

The feed material to be converted is preferably a light hydrocarbon, for example, a $C_1$-$C_4$ alkane. More preferably, the feed material comprises primarily methane with lesser amounts of $C_2$'s and $C_3$'s and trace amounts of higher alkanes. Any feed gas having a methane concentration in excess of about 80% is useful, for example, natural gas which contains about 85% methane, up to about 10% ethane, up to about 3% propane and trace amounts of $C_4$-$C_8$'s. Condensate in the gas should be removed and contaminants, such as hydrogen sulfide, are removed by known methods.

A typical feed will include, in addition to the light hydrocarbon, some carbon dioxide and nitrogen as well as some carbon monoxide, hydrogen, minor amounts of olefins and oxygenated products that are present as a result of recycling from downstream processes, e.g., the Fischer-Tropsch process. In this specification, the conversion of methane in the reaction zone is meant to include the conversion of any light hydrocarbon to synthesis gas.

The catalyst is nickel on alumina and the alumina is a dense, alpha alumina. The preparation of alpha alumina is well described in the literature, e.g., heating any alumina phase above the transition temperature of alpha alumina for a sufficient time to convert all or substantially all of the alumina to the alpha phase. Achieving alpha alumina is not, however, sufficient to provide the attrition resistant catalyst required for this process. Attrition resistance is obtained by continuing to heat the alpha alumina so that its particle density is at least about 2.2 g/cc. This can be accomplished by heating the alpha alumina above about 2200° F. for an extended period of time. Sintering aids, e.g., Na, Mg, $SiO_2$ Cl-, $PO_4$, can be added to the $Al_2O_3$ to accelerate the transformation to a high density alpha $Al_2O_3$.

The alpha alumina of adequate density is then used to support the nickel catalyst metal. Nickel may be applied to the support by known methods, e.g., impregnation by incipient wetness, where the nickel as a water soluble nickel salt, e.g., the nitrate is applied to the support. After impregnation the catalyst is dried and calcined, converting the nickel salt to the oxide. Reduction in hydrogen forms the nickel on alpha alumina catalyst.

Any amount of nickel will promote the desired conversion of methane to synthesis gas and the minimum nickel content is not important except insofar as reasonable commercial reaction rates are achieved and such rates can be achieved with a nickel content of at least about 0.5 wt %. Because catalyst losses as fines are inherent in fluid bed catalyst systems, nickel will be lost from the system and will be available to promote the back reaction of carbon monoxide and hydrogen to methane as the synthesis gas is cooled. As the nickel content of the catalyst increases, the amount of nickel lost from the system will increase with attrition losses and the rate of the back reaction during the cooling step will increase. We find it desirable to maintain a net methane conversion of at least about 90%, that is, of the methane converted to synthesis gas at least about 90% remains converted after the back reaction is completed and the product gases are cooled to a temperature below that which favors the back reaction. Preferably, the net methane conversion is at least about 93%, more preferably, at least about 95% and the upper level of nickel content is selected to maintain the degree of methane conversion. Generally, nickel contents of about 5 wt % or less, preferably 0.5 to 2.5 wt % will be adequate to maintain the desired net methane conversion.

EXAMPLES OF INVENTION

Example 1

The operation of the fluid bed synthesis gas generation process with an $Al_2O_3$ based catalyst that is not predominantly alpha-$Al_2O_3$ (such as gamma-$Al_2O_3$) can lead to major attrition because of the very severe operating conditions: for example, about 1800° F., 360 psia with a steam partial pressure of about 100 psia. The high steam partial pressure combined with the 1800° F. temperature, severely attacks the non-alpha-$Al_2O_3$ phases and results in significant attrition. The table below illustrates the need for an alpha-$Al_2O_3$ catalyst base material.

| Type $Al_2O_3$ | Wt % Attrition after Exposure To 1800° F. With 100 psia Steam |
|---|---|
| Gamma | 66 |
| Alpha | 4–8 |

After the two catalysts were exposed to the severe environment, they were subjected to a standard attrition test in which nitrogen was injected into a standard test apparatus containing a given amount of catalyst. The amount of fines (<20 microns) was measured after a one hour time period. The gamma-$Al_2O_3$ formed 8–16 times more fines than the alpha-$Al_2O_3$

Example 2

Poor attrition resistance of a catalyst operating in a fluid bed synthesis gas generation process can lead to a reduction in net conversion of methane over a period of time and this is illustrated in a test in which a mixture of $CH_4$, steam, and $O_2$ in the feed ratio of 1.0/0.5/0.5 were reacted in a catalytic fluid bed unit operating at 1800° F. and 360 psia. Catalyst fines generated in the reactor can be lost from the bed and are deposited in the equipment lines downstream of the bed.

Figure 2:
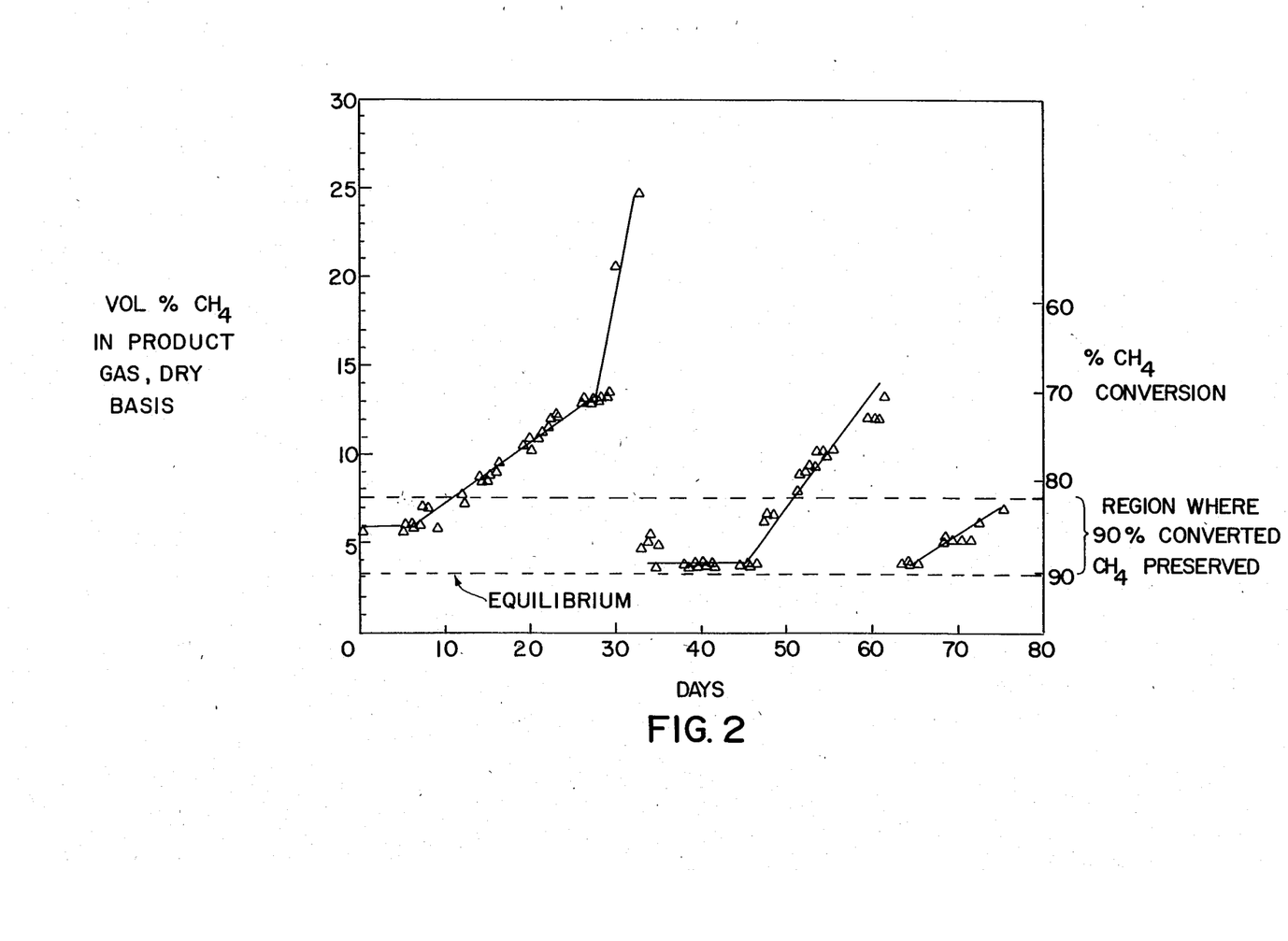
FIG. 2 is a plot of the volume percent methane in the product gas and percent methane converted against time on stream in a fluid bed reactor operating with a catalyst having poor attrition resistance and 10 wt % nickel.

Two Ni on $Al_2O_3$ catalysts were tested. One catalyst, designated as Catalyst A, had poor attrition resistance and the other catalyst, Catalyst B, was prepared by the preferred techniques disclosed in this invention and had excellent attrition resistance. The test results from Catalyst A are shown in FIG. 2. Catalyst A was a gamma alumina having a particle density of less than 2 g/cc. With time, some of the gamma alumina changed to alpha alumina and particle density increased by virtue of exposure to operating conditions for a considerable length of time.

The results are expressed first as volume % methane. After about 12 days on stream the catalyst fines entrained in the product gas and lost from the reactor built up sufficiently in down stream equipment such that the volume % of methane actually recovered in the product gas began to increase substantially. After 36 days on stream the reactor was shut down and the down stream equipment was cleaned of catalyst. Upon starting up the methane in the product gas remained constant at or near the equilibrium value but again started to increase after about 12 days on stream. The reactor was shut down a second time at day 60, the overhead lines cleaned and the reactor put back in service. A similar situation began to occur almost immediately, likely because of increased tendency of the catalyst to attrit after having been in service for over 60 days. The plot shows that the equilibrium methane conversion for the reaction results in about 3.5 vol % methane in the product gas which corresponds to about 90 conversion. Maintaining at least 90% of the product gas formed as synthesis gas, i.e., the net methane conversion corresponds to about 81% total conversion and about 7.5 vol % methane in the product gas.

These results show that the reformation of methane from carbon monoxide and hydrogen was promoted in the lines down stream of the reactor when catalyst build up in these was sufficient to promote the back reaction. When the catalyst carried over from the reactor to the overhead lines, the methane conversion returned to the equilibrium value because the back reaction no longer occurred. By eliminating the catalyst in the overhead lines from the reactor the back reaction is eliminated and the product gas is preserved as synthesis gas.

Figure 3:
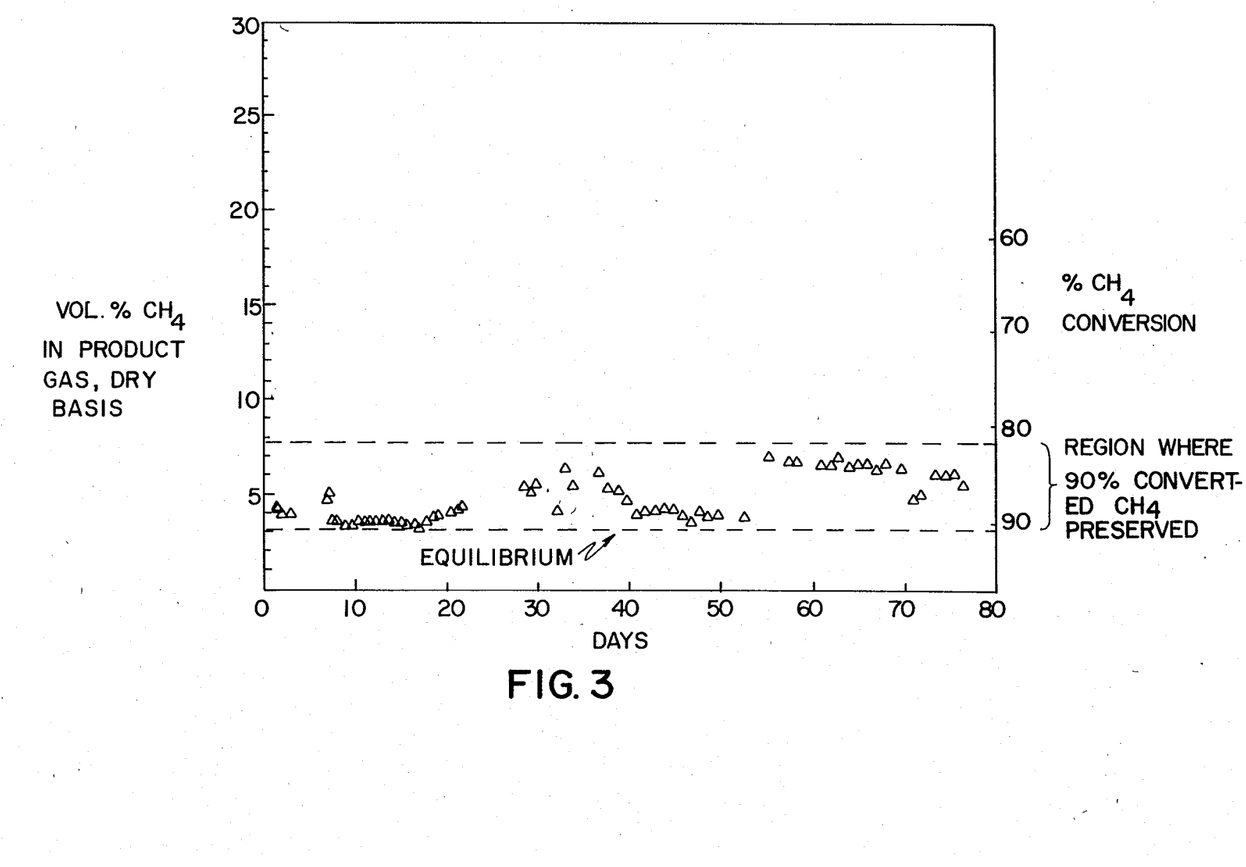
FIG. 3 is a plot similar to that of FIG. 2 but of t of a fluid bed reactor operating with a catalyst having the preferred attrition resistance and 1 wt % nickel.

Catalyst B, prepared by the preferred procedures disclosed in this invention, was tested in a similar run. The results of this test are shown in FIG. 3. In this case, negligible catalyst fines formed during the run and the equilibrium steam reforming temperatures remained essentially equal to the reactor temperature. Methane conversion as synthesis gas was maintained in excess of 90%. Catalyst B contained primarily alpha-$Al_2O_3$ but had a particle density of 3.6 g/cc. Examination of the downstream equipment showed virtually no adherent catalyst fines on equipment walls.

That the catalyst of FIG. 2 had 10 wt % nickel and the catalyst of FIG. 3 had 1 wt % nickel is of little matter. Nickel on alumina promotes the reaction of methane to synthesis gas and of synthesis gas to methane at quantities as low as about 0.1–0.5 wt % nickel. The entrained catalyst from FIG. 2 was a result of attrition and the back reaction simply occurred more quickly than it would have if a 1 wt % nickel catalyst was employed. Thus, by maintaining the nickel content at relatively low values and the particle density at relatively high values entrained catalyst can be substantially avoided.

These data demonstrate that poor attrition resistance can have a significant adverse affect on a fluid bed process well beyond catalyst make-up requirement. The decrease in methane conversion can have a major economic debit particularly for a process scheme in which the synthesis gas is further reacted in the Fischer-Tropsch process to produce higher molecular weight hydrocarbons. By operating with a catalyst having a particle density in the preferred range of 2.5–3.6 g/cc, the amount and nature of the catalyst fines is such that there is negligible accumulation on the walls of the downstream equipment and the undesired reverse reaction of the synthesis gas to reform $CH_4$ can be minimized substantially.

Example 3

Figure 4:
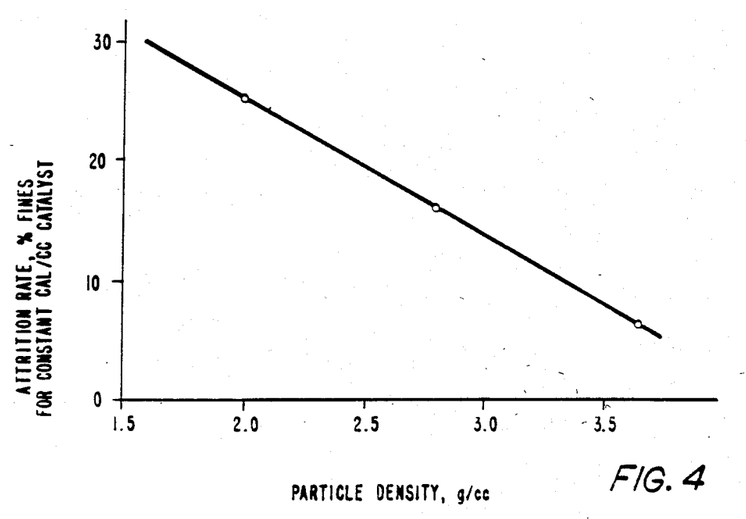
FIG. 4 is a plot of attrition versus catalyst particle density.

The primary method for producing an $Al_2O_3$ catalyst material that will have good attrition resistance under severe operating conditions requires converting the $Al_2O_3$ into its alpha phase by extensive heating beyond the point of initial formation of alpha-$Al_2O_3$ to a point at which the particle density has increased into the region of 2.5-3.6 g/cc. This additional heating causes the individual crystals in the alpha-$Al_2O_3$ particles to achieve further growth such that the bonding of the small crystallites becomes enhanced and improves the attrition resistance. During this heating, the pore structure decreases and provides additional strength. The attrition characteristics for alpha-$Al_2O_3$ at different particle densities are illustrated in FIG. 4. Catalyst B in Example 2 was made by this process and had a particle density of 3.6 g/cc. The attrition test used is conducted by operating a fluid bed at a given inlet gas velocity across a distributor with the same energy input per unit volume of catalyst in all tests. The catalyst is withdrawn from the bed at the end of the test and a particle size analysis is performed. The wt % of particles less than 20 microns is determined and this is the value plotted. In each case, the starting material contained no particles <20 microns.

Example 4

Figure 5:
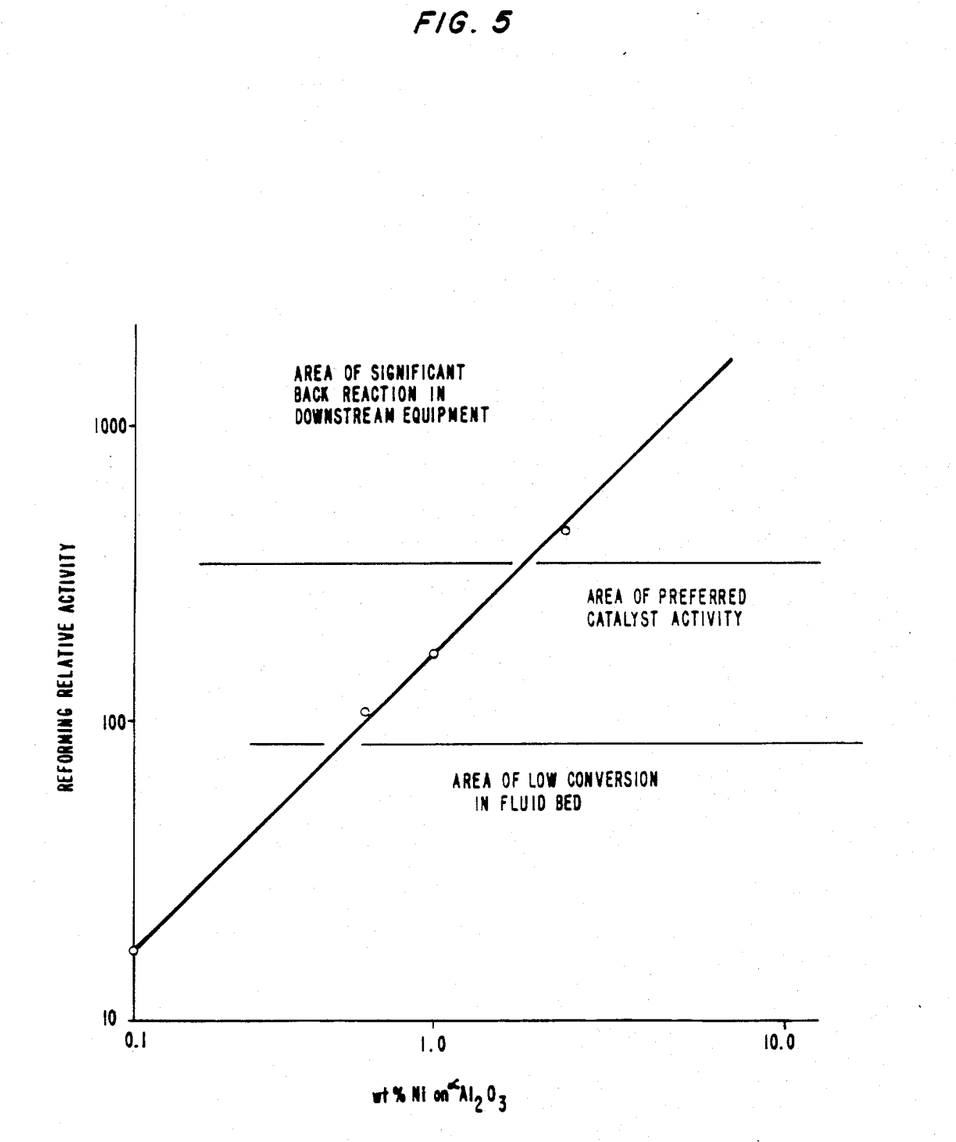
FIG. 5 is a plot of activity versus wt % Ni on an alpha alumina catalyst having acceptable attrition resistance.

The back reaction is limited also by the amount of Ni on the alpha-$Al_2O_3$ base material. A certain amount of catalytic activity is required in the fluid bed reactor, but at some point the overall reaction becomes limited by the mass transfer of reactants from the bubble phase in the reactor to the emulsion phase where the catalyst is present or reaches thermodynamic equilibrium. Any Ni that is impregnated on the catalyst beyond either the mass transfer limitation or beyond the point of achieving equilibrium does not improve operations of the fluid bed reactor, but instead actually causes process debits because any fines that enter the reactor downstream equipment cause back reactions to occur at a high reaction rate. A high Ni content in the catalyst fines will cause large increases in the reaction rate in the downstream equipment, thereby reducing the overall net conversion of $CH_4$ in the process. In FIG. 5, the preferred Ni content is shown to be in the region of 0.5 wt % to almost 2.5 wt %. Below 0.5 wt % Ni on the preferred alpha-$Al_2O_3$ leads to somewhat uneconomical fluid bed heights to achieve desired conversion. Ni contents above 2.5 wt % lead to significant reverse reactions in the downstream equipment, i.e., a net methane conversion of less than 9% results.

We claim:
1. A process for converting a feed primarily containing methane to carbon monoxide and hydrogen which comprises:
  (a) reacting in a fluid bed reaction zone the feed with steam and oxygen at a temperature of at least 1700° F., in the presence of a catalyst containing about 0.5 wt % to about 2.5 wt % nickel on an alpha-alumina support thereby forming a product gas comprising carbon monoxide, hydrogen, and entrained catalyst;
  (b) cooling the product gas in a cooling zone to a temperature below about 1200° F.;
  (c) maintaining at least about 90% of the synthesis gas formed in the reaction zone as carbon monoxide and hydrogen through the cooling zone, and
  (d) wherein the catalyst has a particle density of about 2.4 g/cc to about 3.9 g/cc and the catalyst is substantially free of silica.
2. The process of claim 1 wherein the product gas is cooled to less than about 900° F.
3. The process of claim 1 wherein the silica content of the catalyst is less than about 1.5 wt %.
4. The process of claim 1 wherein the catalyst support is at least about 95 wt % alpha-alumina.
5. The process of claim 1 wherein the catalyst particle size is about 30-150 microns.

* * * * *